Figure 1:
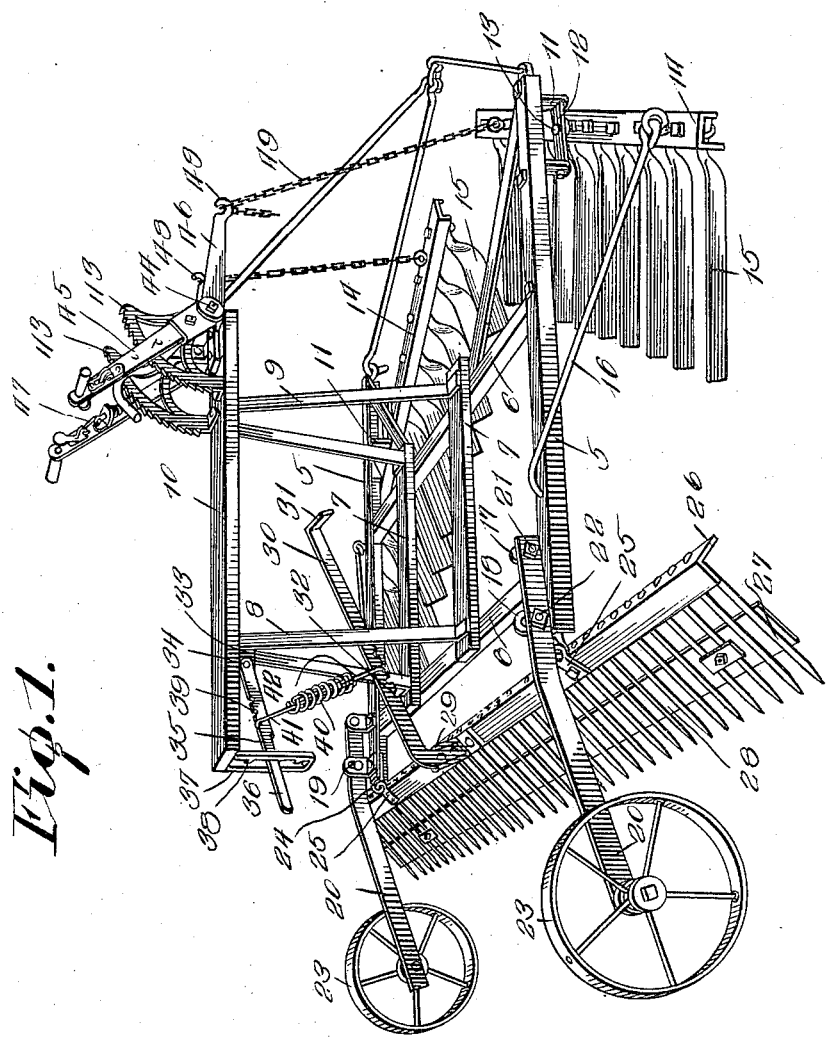

A. J. TOWER.
SOIL PULVERIZING MACHINE.
APPLICATION FILED FEB. 17, 1912.

1,041,199.

Patented Oct. 15, 1912.

2 SHEETS—SHEET 1.

Witnesses

Inventor
A. J. Tower
By
Attorneys

A. J. TOWER.
SOIL PULVERIZING MACHINE.
APPLICATION FILED FEB. 17, 1912.
1,041,199.
Patented Oct. 15, 1912.
2 SHEETS—SHEET 2.
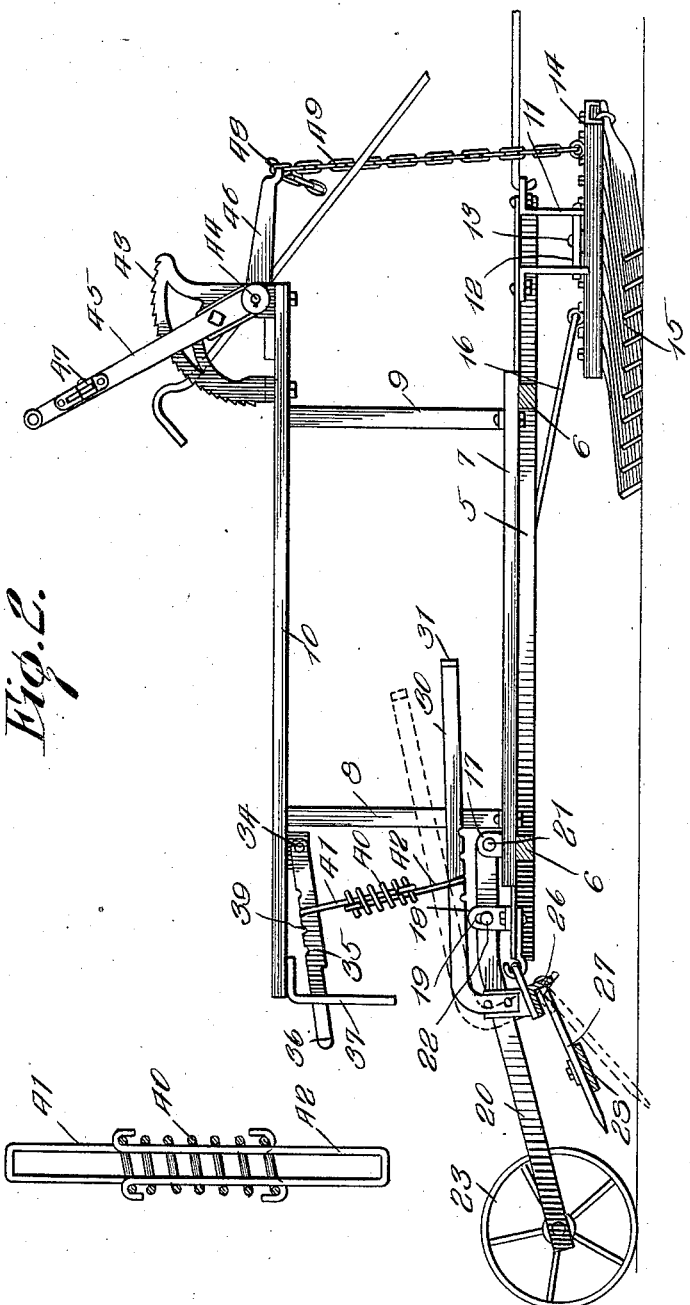
Witnesses
Inventor
A. J. Tower.
By
Attorneys

UNITED STATES PATENT OFFICE.

ANDREW J. TOWER, OF MENDOTA, ILLINOIS.

SOIL-PULVERIZING MACHINE.

1,041,199.  Specification of Letters Patent.  Patented Oct. 15, 1912.

Application filed February 17, 1912. Serial No. 678,379.

*To all whom it may concern:*

Be it known that I, ANDREW J. TOWER, a citizen of the United States, residing at Mendota, in the county of Lasalle, State of Illinois, have invented certain new and useful Improvements in Soil-Pulverizing Machines; and I do hereby declare the following to be a full, clear, and exact description of the invention, such as will enable others skilled in the art to which it appertains to make and use the same.

This invention relates to improvements in machines for pulverizing soil, and is in the nature of improvements upon Patent No. 138,301 granted to A. C. Tower, April 29, 1873.

In the construction shown in the above mentioned patent together with similar machines now in common use, the inner ends of the knife-carrying frames would by reason of the draft be caused to penetrate the soil to a greater depth than the outer ends of said frames. To overcome this, chains were respectively connected to the inner ends of these frames, and the free ends of the chains were adapted to have adjustable connection with hooks mounted upon the main frame of the machine. Practice demonstrated that it was necessary to frequently adjust the planes of these frames on account of the various conditions of the soil which was being pulverized, and by means of this construction in order to adjust said frames, it was necessary to stop the machine and adjust the chains with respect to the hooks. This mode of adjustment necessarily consumed considerable time, and was at the same time extremely awkward of accomplishment.

One of the principal objects of this invention is, therefore, to provide a pair of hand levers which are connected to the chains and which are disposed directly in advance of the operator, whereby the operator may without stopping the machine quickly adjust the horizontal plane of either of the frames.

Another important object of this invention is to provide a pulverizer having a drag rake yieldingly supported in rear of the knife-carrying frames, said yielding means permitting of the same readily yielding to uneven conditions of the soil.

Another object of the invention is to provide a novel mechanism for adjusting the tension of said yielding mechanism.

A further object of the invention is to provide a yieldable mechanism for the purpose described which includes a foot lever adapted upon depression to elevate the drag rake above the soil.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims may be resorted to without departing from the spirit or sacrificing any of the advantages of the invention.

In the drawings: Figure 1 is a perspective view of the invention, and Fig. 2 is a longitudinal sectional view therethrough showing parts thereof in adjusted positions, and Fig. 3 is a detail sectional view of a certain spring employed in this invention.

Like reference numerals designate corresponding parts in all the figures of the drawings.

Referring to the drawings, the main frame of the invention is formed from angle iron, and comprises side sills 5—5 which are connected intermediate their ends by transverse sills 6—6. Centrally supported upon the sills 6 are spaced frame members 7—7, and attached to the opposite ends of these members are spaced pairs of standards 8—8 and 9—9. Supported by these standards 8 and 9 is a longitudinally disposed operator's seat 10.

Secured to the forward end of each side sill 5 and depending therebelow is a pair of spaced bearings 11—11, and journaled in said bearings is a longitudinally disposed pivot pin 12 to which is centrally secured by means of a bolt 13, a horizontally disposed frame or bar 14, said frame carrying a plurality of drag-knives 15. This frame or bar 14 is disposed at about a forty-five degree angle with respect to the side sill 5, so that the inner ends of each bar 14 is disposed in advance of the outer ends thereof. Each of these frames are held against horizontal swinging movements by means of a brace rod 16 which is connected at one end to the respective side sill 5 and at its other end to the outer end of the bar.

Secured to the rear end of each side sill 5 is a pair of brackets 17 and 18, the latter being formed with an elongated slot 19. Extending rearwardly from the frame and in longitudinal alinement with the side sills 5 is a pair of supporting arms 20, the forward end of each arm being pivotally connected, as at 21, to the bracket 17 and having adjustable engagement with the slot bracket 18 by means of a bolt 22. These arms 20 preferably curve downwardly and support ground wheels 23 at their rear ends. It will thus be observed that by means of these wheels, the rear portion of the main frame is supported above the earth. Projecting rearwardly from the rear end of each side sill 5 is an upwardly turned hook 24, and engageable with these hooks are eyes 25—25 which are fixedly secured to a head 26 of a rake, said rake including the usual teeth 27. Attached to the teeth 27 is a smoothing board 28. This rake is swingingly mounted by means of the hooks 24 and eyes 25 so as to form what is known as a drag-rake which when the machine is moved forwardly will disintegrate the clots of earth, the smoothing board 28 of the rake tending to smooth or level the earth.

At times it is desired to create more or less pressure upon the drag rake, and in order to accomplish this the following mechanism is employed: Centrally secured to the head 26 of the rake is an upstanding ear 29 to which is attached one end of a foot lever 30, said lever extending forwardly below the operator's seat 10 and terminating in a lateral bend 31 which constitutes a foot pedal. This lever is preferably formed of bar iron, and is centrally formed on its underside with a plurality of spaced notches 32. A bracket 33 is secured to the underside of the seat 10, and pivotally connected thereto as at 34, is the forward end of a hand lever 35, the rear end 36 thereof projecting through a downwardly extending U-shaped rack frame 37 which is secured to the rear end of the seat 10. One leg of this rack frame is formed with a plurality of inwardly extending fingers 38 which constitute seats for the hand lever 35. The upper edge of the hand lever 35 is formed with a plurality of spaced notches 39. A double coil spring 40 of common construction, includes the usual end loops 41 and 42 respectively, the former being adapted to engage within any of the recesses 39 of the hand lever 35 and the latter within any of the recesses 32 of the foot lever 30. By means of this spring 40 it will be observed that upon movement either up or down of the hand lever 35 more or less pressure may be instantly exerted upon the drag rake above described. When it is desired to raise the rake on account of stones or other like obstructions, the operator pushes down on the lateral extension 31 of the foot lever 30, and as a result, the rake will swing upwardly upon the hooks 24, and against the tension of the spring 40.

Immediately upon release of the foot lever by the operator, the spring 40 will immediately return the rake to its proper working position. It will furthermore be observed that by means of the notch 39, hand lever 35 and the notches 32 in the foot lever 30, the spring 40 may be adjusted to a nicety, whereby the pressure of the rake upon the soil may be graduated to a very small degree.

It has been found in practice that with this type of machine, on account of the draft as well as the weight of the machine, the inner portions of the knife-frames have a tendency to cut deeper into the soil than the outer portions of said frames. Also it has been demonstrated that considerable difficulty has been occasioned in quickly arranging the angles of inclination of the knife-carrying frames to accommodate them to uneven or hilly ground. Therefore, in order to prevent the inner portions of said frames from working deeper than the outer portions and also to permit of the angles of said frames to be easily adjusted, I have mounted upon the forward end of the seat 10 a pair of arcuate segments 43—43. Pivotally connected to each segment, as at 44, is a hand lever 45, said lever projecting beyond its pivot to form a crank arm 46. Associated with each hand lever is a spring actuated pawl 47 adapted for engagement with its respective segment 43. The outer end of each crank arm 46 terminates in a hook 48 which is adapted to be engaged by any link of a chain 49, the lower end of said chain being fixedly connected to the inner end of a respective frame or bar 14. It will thus be observed that the operator can readily manipulate either of the hand levers 45 to quickly raise or release the inner ends of said knife-carrying frames without the necessity of stopping the machine. It will also be observed that by means of the hand levers, the angles of these frames may be retained in a constant position, or when so desired may be readily adjusted by the operator. By this construction the angles of inclination of the knife-carrying frames and the pressure of the rake may readily be controlled by the operator without him having to dismount or without stopping the machine.

What is claimed is:

1. In a soil pulverizing machine, the combination with a main frame, of a transversely disposed drag rake swingingly supported by said frame, a foot lever fixed to said rake, a hand lever fulcrumed on the frame above the foot lever, and a spring connecting the levers for yieldingly holding the rake against the soil.

2. In a soil pulverizing machine, the combination with a main frame, of a transversely disposed drag rake swingingly supported by said frame, a forwardly extending foot lever fixed to said rake, a seat supported by the frame above the foot lever, and a spring having connection at one end with the seat and at its other end with the foot lever for yieldably holding the rake against the soil.

3. In a soil pulverizing machine, the combination with a main frame, of a transversely disposed drag rake swingingly supported by said frame, a forwardly extending foot lever fixed on said rake, a seat supported by the frame above the foot lever, a hand lever fulcrumed on the seat, a spring having connection at one end with the foot lever and at its other end with the hand lever for yieldably holding the rake against the soil, and a rack carried by the seat for engagement by the hand lever to regulate the tension of the spring.

4. In a soil pulverizing machine, the combination with a main frame, of a transversely disposed drag rake swingingly supported by said frame, a forwardly extending foot lever fixed to said rake and having a plurality of notches formed along its underside, a seat supported by the frame above the foot lever, a hand lever fulcrumed on the seat and formed with a plurality of notches along its upper side, a rack carried by the seat for engagement with the hand lever, and a spring having its ends respectively connected with certain of the notches of the foot and hand levers.

In testimony whereof, I affix my signature, in presence of two witnesses.

ANDREW J. TOWER.

Witnesses:
 JOHN A. LAMBERTON,
 LUCIAN B. CROOKER.

Copies of this patent may be obtained for five cents each, by addressing the "Commissioner of Patents, Washington, D. C."